United States Patent [19]
Breed et al.

[11] Patent Number: 5,653,464
[45] Date of Patent: Aug. 5, 1997

[54] AIRBAG SYSTEM WITH SELF SHAPING AIRBAG

[75] Inventors: David S. Breed, Boonton Township, Morris County; William Thomas Sanders, Rockaway Township, Morris County, both of N.J.

[73] Assignee: Automotive Technologies International Inc., Denville, N.J.

[21] Appl. No.: 539,676

[22] Filed: Oct. 5, 1995

[51] Int. Cl.⁶ ............................................. B60R 21/16
[52] U.S. Cl. ............................. 280/743.1; 428/35.5
[58] Field of Search ................ 280/743.1, 728.1; 428/137, 224, 35.2, 35.5

[56] References Cited

U.S. PATENT DOCUMENTS

| | | | |
|---|---|---|---|
| 4,963,412 | 10/1990 | Kokeguchi | 428/137 |
| 5,188,558 | 2/1993 | Barton et al. | 446/224 |
| 5,248,275 | 9/1993 | McGrath et al. | 446/224 |
| 5,279,873 | 1/1994 | Oike | 428/35.4 |
| 5,295,892 | 3/1994 | Felton | 446/224 |
| 5,336,538 | 8/1994 | Kitamura | 428/35.2 |
| 5,382,051 | 1/1995 | Glance | 290/743.14 |
| 5,390,950 | 2/1995 | Barnes et al. | 280/728 B |
| 5,505,485 | 4/1996 | Breed | 280/729 |
| 5,538,280 | 7/1996 | Gray et al. | 280/743.1 |

FOREIGN PATENT DOCUMENTS

| | | | |
|---|---|---|---|
| 0478897 | 4/1992 | European Pat. Off. | 280/743.1 |
| 2162134 | 6/1990 | Japan | 280/743.1 |

Primary Examiner—Christopher P. Ellis

[57] ABSTRACT

An inflatable occupant restraint device in an occupant protection system of a vehicle having at least two pieces of substantially flat inelastic plastic film having peripheral edges attached together only at their peripheral edges to form a substantially sealed airbag, an inflator coupled to the airbag and to the vehicle for inflating the airbag by providing gas to the airbag through at least one port in one of the pieces of elastic film, and an initiator for initiating the inflator in response to a crash of the vehicle. Upon inflation of the airbag, the at least two pieces of inelastic plastic film deform substantially without stretching, in particular to create a shape for the airbag where the thickness is substantially smaller than the width or height and/or to provide the airbag with an ellipsoidal shape.

25 Claims, 12 Drawing Sheets

PRIOR ART

FIG. 1A

PRIOR ART

PRIOR ART

FIG. 8

PRIOR ART

FIG. 9

AIRBAG SYSTEM WITH SELF SHAPING AIRBAG

This application is related to U.S. patent application Ser. No. 08/247,763 filed May 23, 1994 to D. S. Breed titled Plastic Film Airbag now U.S. Pat. No. 5,505,485.

BACKGROUND OF THE INVENTION

1. Field of the Invention

This invention relates to an airbag made at least partially from two panels, e.g., front and back panels, of relatively inelastic plastic film in such a manner that it automatically attains a desired shape without the use of tethers which connect the front and back panels.

2. Description of the Prior Art

A conventional driver side airbag (also referred to herein as a driver airbag) is made from pieces of either Nylon or polyester fabric which are joined together by sewing. The airbag is coated on the inside with neoprene or silicone for the purposes of (i) capturing hot particles emitted by the inflator and preventing holes from being burned in the fabric, and (ii) sealing the airbag to minimize the leakage of an inflating gas through the fabric. These airbags are conventionally made by first cutting two approximately circular sections of a material having a coating on only one side which will form a front panel and a back panel, and sewing them together with the coated side facing out. The back panel contains a hole for attachment to an inflator. Fabric straps, called tethers, are then sewn to the front panel. Afterwards, the airbag is turned inside out by pulling the fabric assembly through the inflator attachment hole placing the coated side on the inside. Assembly is completed by sewing the tethers to the back panel adjacent the inflator attachment hole.

If a conventional driver airbag is inflated without the use of tethers, the airbag will take an approximately spherical shape. Such an airbag would protrude significantly into the passenger compartment from the steering wheel and, in most cases, impact and injure the driver. To prevent this possible injury, the tethers are attached to the front and rear panels of the airbag to restrict the displacement of the front panel relative to the back panel. The result of the addition of such tethers is an airbag which has the shape of a flat ellipsoid with a ratio of the thickness of the airbag to its diameter of approximately 6. In the conventional airbag, the tethers are needed since the threads which make up the airbag fabric are capable of moving slightly relative to each other. The airbag is elastic for stresses which are not aligned with the warp or woof of the fabric. As a result, the fabric distorts to form an approximate sphere.

Moreover, the above-mentioned method of manufacturing an airbag involves a great deal of sewing and thus is highly labor intensive and, as a result, a large percentage of all driver airbags are manufactured in low labor cost countries such as Mexico.

Many people are now being injured and some killed by interaction with the deploying airbag. One of the key advantages of the film airbag described in the above referenced patent application is that, because of its much lower mass, the injury caused by this interaction is substantially reduced. In accordance with the teachings of that patent application, the driver airbag system can be designed to permit some significant interaction with the driver. In other words, the film airbag can be safely designed to intrude substantially further into the passenger compartment without fear of injuring the driver. Nevertheless, in some cases it may be desirable to combine the properties of a film airbag which automatically attains the proper driver airbag shape with a fabric. In such cases, interaction with the driver needs to be minimized.

Airbags made of plastic film are disclosed in the copending patent application Ser. No. 08/247,763 referenced above and incorporated herein by reference. Many films have the property that they are quite inelastic under typical stresses associated with an airbag deployment. If an airbag is made from flat circular sections of such films and inflated, instead of forming a spherical shape, it automatically forms the flat ellipsoidal shape required for driver airbags. This unexpected result vastly simplifies the manufacturing process for driver airbags since tethers are not required. Furthermore, since the airbag can be made by heat sealing two flat circular sections together without the need for tethers, the entire airbag can be made without sewing reducing labor and production costs. In fact, the removal of the requirement for tethers permits the airbag to be made by a blow molding or other similar process. Indeed, this greatly reduces the cost of manufacturing driver airbags.

In addition to the above referenced patent application, film material for use in making airbags is described in U.S. Pat. No. 4,963,412 to Kokeguchi. The film airbag material described in the Kokeguchi patent is considerably different in concept from that disclosed in the above referenced patent application Ser. No. 08/247,763 or the instant invention. The prime feature of the Kokeguchi patent is that the edge tear resistance of the airbag film material can be increased through the use of holes in the plastic films. Adding holes, however, reduces the tensile strength of the material by factor of two or more due to the stress concentration effects of the hole. It also reduces the amount of available material to resist the stress. As such, it is noteworthy that the Kokeguchi airbag is only slightly thinner than the conventional fabric airbag (320 micrometers vs. the conventional 400 micrometers) and is likely to be as heavy or perhaps heavier than the conventional airbag. Also, Kokeguchi does not disclose any particular shapes of film airbags. As will be discussed below in detail, the airbags constructed in accordance with the present teachings attain particular shapes based on the use of the inelastic properties of particular film materials.

The neoprene or silicone coating on conventional driver airbags, as mentioned above, serves to trap hot particles which are emitted from the inflator, such as a conventional sodium azide inflator. A film airbag will be vulnerable to such particles and as a result will not work effectively with sodium azide inflators. Fortunately, new inflators are being developed which do not produce hot particles but instead produce gases which are substantially cooler than gases produced by sodium azide inflators.

In the conventional airbag, the propellant which is used to inflate the airbag also is used to force open a hole in the vehicle trim, called the deployment door, permitting the airbag to deploy. Since the mass of a film airbag is substantially less than the conventional fabric airbag, much less energy is required to deploy the airbag in time. However, substantial pressure is still required to open the deployment door. Also, if the pressure now used to open the deployment door is used with film airbags, the rate of deployment, once the door has been opened, will be substantially faster than conventional airbags. This rapid deployment puts excessive stresses on the film airbag and increases the chance that the occupant will be injured thereby. For most implementations of the film airbag, an alternate less energetic method of opening the deployment door is necessary.

One such system is disclosed in Barnes et al. U.S. Pat. No. 5,390,950 titled "Method and arrangement for forming an air bag deployment opening in an auto interior trim piece". This patent describes a method of forming an air bag deployment opening in an interior trim piece having an vinyl skin overlying a rigid substrate so as to be invisible prior to operation of the air bag system and comprises an energy generating linear cutting element arranged in a door pattern beneath the skin acting to degrade or cut the skin when activated.

The goal of the Barnes et al. patent is to create an invisible seam when the deployment door is located in a visible interior trim panel. This permits greater freedom for the vehicle interior designer to create the particular aesthetic effect that he or she desires. The invisible seam of the Barnes et al. patent is thus created for aesthetic purposes with no thought toward any advantages it might have to reduce occupant injury or advantages for use with a film airbag, or to reduce injuries at all for that matter. One unexpected result of applying the teachings of this patent therefore, is that the pressure required to open the deployment door is substantially reduced. When used in conjunction with a film airbag, this result is important since the inflator can be designed to provide only sufficient energy to deploy and inflate the very light film airbag thereby significantly reducing the size of the inflator. The additional energy required to open a conventional deployment door above that required to open a door constructed in accordance with the teachings of the Barnes et al. patent is not required within the inflator. Furthermore, since a film is more vulnerable to being injured by ragged edges on the deployment door than a conventional fabric airbag, the device of the Barnes et al. patent can be used to pyrotechnically cut open the deployment door permitting it to be easily displaced from the path of the deploying airbag, minimizing the force of the airbag against the door and thus minimizing the damage to the film airbag from the deployment door. Since Barnes et al. did not contemplate a film airbag, advantages of its use with the pyrotechnically opening deployment door could not have been contemplated.

The discussion of the self-shaping airbag thus far has been limited to film airbags. An alternate approach is to make an airbag from a combination of fabric and film. The fabric provides the tear resistance and conventional airbag appearance. The film forces the airbag to acquire the flat ellipsoidal shape desired for driver airbags without the use of tethers and permits the airbag to be assembled without sewing using heat and/or adhesive sealing techniques. Such a hybrid airbag is made from fabric and film which have been laminated together prior to the cutting operation. Naturally, the combination of a film and net, as described in the above referenced patent application, is equally applicable for the airbag described here and both will be referred to herein as hybrid airbags.

A finite element analysis of conventional driver side airbags shows that the distribution of stresses is highly unequal. Substantial improvements in conventional airbag designs can be made by redesigning the fabric panels so that the stresses are more equalized. Today, conventional airbags are designed based on the strength required to support the maximum stress regardless of where that stress occurs. The entire airbag must then be made of the same thickness material as that chosen to withstand maximum stress condition. Naturally, this is wasteful of material and attempts have been made to redesign the airbag to more closely equalize the stress distribution and thus permit a reduction in fabric strength and thus thickness and weight. However, this optimization process when used with conventional fabric airbags can lead to more complicated assembly and sewing operations. Thus, there is a tradeoff between manufacturing cost and airbag optimization.

With the film airbag manufactured using blow molding techniques, for example, much greater freedom is permitted to optimize the airbag vis-à-vis equalization of the stress. First, other than tooling cost, the manufacturing cost of an optimized airbag is no greater than for a non-optimized airbag. Furthermore, the thickness of the film can be varied from one part of the airbag to another to permit the airbag to be thicker where the stresses are greater and thinner where the stresses are less. A further advantage of blow molding is that the film can be made of a single constituent material. When the airbag is fabricated from sheet material, the outside layer of the material needs to be heat sealable such as polyethylene or else a special adhesive layer is required where the sealing occurs.

One example of an inflatable film product which illustrates the technology of this invention is the common balloon made from metalized "Mylar" plastic film found in many stores. Frequently these balloons are filled with helium. They are made by heat sealing two flat pieces of film together as described in U.S. Pat. Nos. 5,188,558, 5,248,275, 5,279,873, and 5,295,892. The shape of these balloons, which is circular in one plane and elliptical in the other two planes, is very nearly the shape which is desired for a driver side airbag. This shape is created when the pressure within the balloon is sufficiently low such that the stresses induced into the film are much smaller than the stresses needed to significantly stretch the film. The film used is relatively rigid and has difficulty adjusting to form a spherical shape. In contrast, the same airbag made from woven material more easily assumes an approximate spherical shape requiring the use of tethers to create the shape which comes naturally with the Mylar balloons.

One problem with film balloons is that when a hole is punctured in the balloon it fails catastrophically. One solution to this problem is to use the combination of a film and net as described in the above referenced patent application. Such materials have been perfected for use as sail material for lightweight high performance sails for sailboats. One example is marketed under the trade name Bainbridge Sailcloth SL Series™, and in particular SL 500-P™, 1.5 mill. This material in a laminate of a film and a net. Such materials are designed to permit heat sealing thereby eliminating threads and the stress concentrations associated therewith. Heat sealing also simplifies the manufacturing process for making sails. Another preferable solution is to make the airbags from a film material which naturally resists tears, that is, one which is chemically formulated to arrest a tear which begins from a hole, for example.

Applications for the self shaping airbag described herein include all airbags within the vehicle which would otherwise required tethers or complicated manufacturing from several separate panels. Most of these applications are more difficult to solve or unsolvable using conventional sewing technology. The invention described herein solves the above problems by using the inelastic properties of film, otherwise stated as their high modulus of elasticity, plus innovative designs based on analysis including mathematical modeling plus experimentation. In this manner, the problems discussed above, as well as many others, are alleviated or solved by the self shaping airbags described in the paragraphs below.

OBJECTS AND SUMMARY OF THE INVENTION

A principal object of this invention is to form an airbag from flat sheets of film or composite material, or by blow molding or a similar process in order to create an airbag for use as a driver side airbag which is substantially elliptical in two orthogonal planes and is circular in a third orthogonal plane. If a composite material composed of film and a net, or film and a fabric, is used to form a hybrid design, the relatively inelastic properties of the film are used to create the desired flat elliptical shape while the net or fabric is used to provide other desirable features including tear resistance.

Other objects and advantages of this invention include:

1. To provide an airbag which can be made without the use of sewing.
2. To provide an airbag which is considerably lighter and smaller when folded in the inoperative condition than conventional fabric airbags.
3. To provide a driver airbag which does not require the use of tethers.
4. To provide an airbag for use on the front passenger side of the vehicle which can be easily manufactured from a minimum number of parts without the use of sewing.
5. To provide a substantially conventional driver fabric airbag which can be manufactured without the use of tethers.
6. To provide an airbag which can the manufacturing using a low cost blow molding or similar technology.
7. To provide an airbag which has been optimized to substantially equalize the stresses in the material.
8. To provide an airbag where the material thickness is varied to reduce the stress in the high stress areas of the airbag.
9. To provide an airbag where optimization procedures have been used to substantially eliminate folds and wrinkles in the surface of the inflated airbag.
10. To provide an airbag comprising film where the thickness to diameter ratio is less than 7 without the use of tethers and, in some cases, less than 6.
11. To provide a very low cost airbag.
12. To provide a method of manufacturing an airbag permitting any desired shape airbag to the manufactured from two panels.
13. To provide an airbag module utilizing the combination of an airbag made substantially of film and a pyrotechnically opening deployment door.
14. To provide an airbag module which is substantially less injurious to out-of position occupants during airbag deployment.

Other objects and advantages of the present invention will become apparent from the following description of the preferred embodiments taken in conjunction with the accompanying drawings.

Briefly though, in a most basic embodiment, the inflatable occupant restraint device in an occupant protection system of a vehicle in accordance with the invention comprises at least two pieces of substantially flat inelastic plastic film having peripheral edges, a first one of the pieces of inelastic plastic film having at least one port; first attachment means for attaching the pieces of inelastic plastic film together only at the peripheral edges to form a substantially sealed airbag; inflating means for inflating the airbag by directing gas into an interior of the airbag through the at least one port; coupling means for coupling the airbag to the inflating means; initiation means for initiating the inflation means in response to a crash of the vehicle to thereby cause deployment of the airbag; and second attachment means for attaching the inflating means to the vehicle. In this manner, upon inflation of the airbag by the inflating means, the pieces of inelastic plastic film deforms substantially without stretching. Also, the attaching of the pieces of plastic film together only at the peripheral edges precludes the use of tethers which are conventionally used to connect inner regions of the pieces of airbags together to provide the desired ellipsoid shape.

With respect to specific parts of the vehicle to which the airbag may be attached, suitable parts include the steering wheel of the vehicle, the headliner of the vehicle and an instrument panel of the vehicle. The airbag when deployed from the headliner preferably extends substantially across a major portion of the front seat of the vehicle if not the entire front seat.

The airbag may also include means for preventing the propagation of a tear, such as a laminated fabric or net, which are connected to each of the pieces of inelastic plastic film, or within the formulation of the plastic film material itself.

In another embodiment, the piece of inelastic plastic film having the port also includes at least one variable outlet vent comprising pressure responsive means for controlling opening thereof and thus flow of gas therethrough in response to pressure within the airbag. In this manner, upon inflation of the airbag, the variable vent is substantially closed until the airbag is impacted by the occupant at which time the variable vent opens by an amount determined by the pressure in the airbag thereby controlling the deceleration of the occupant.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 1A:
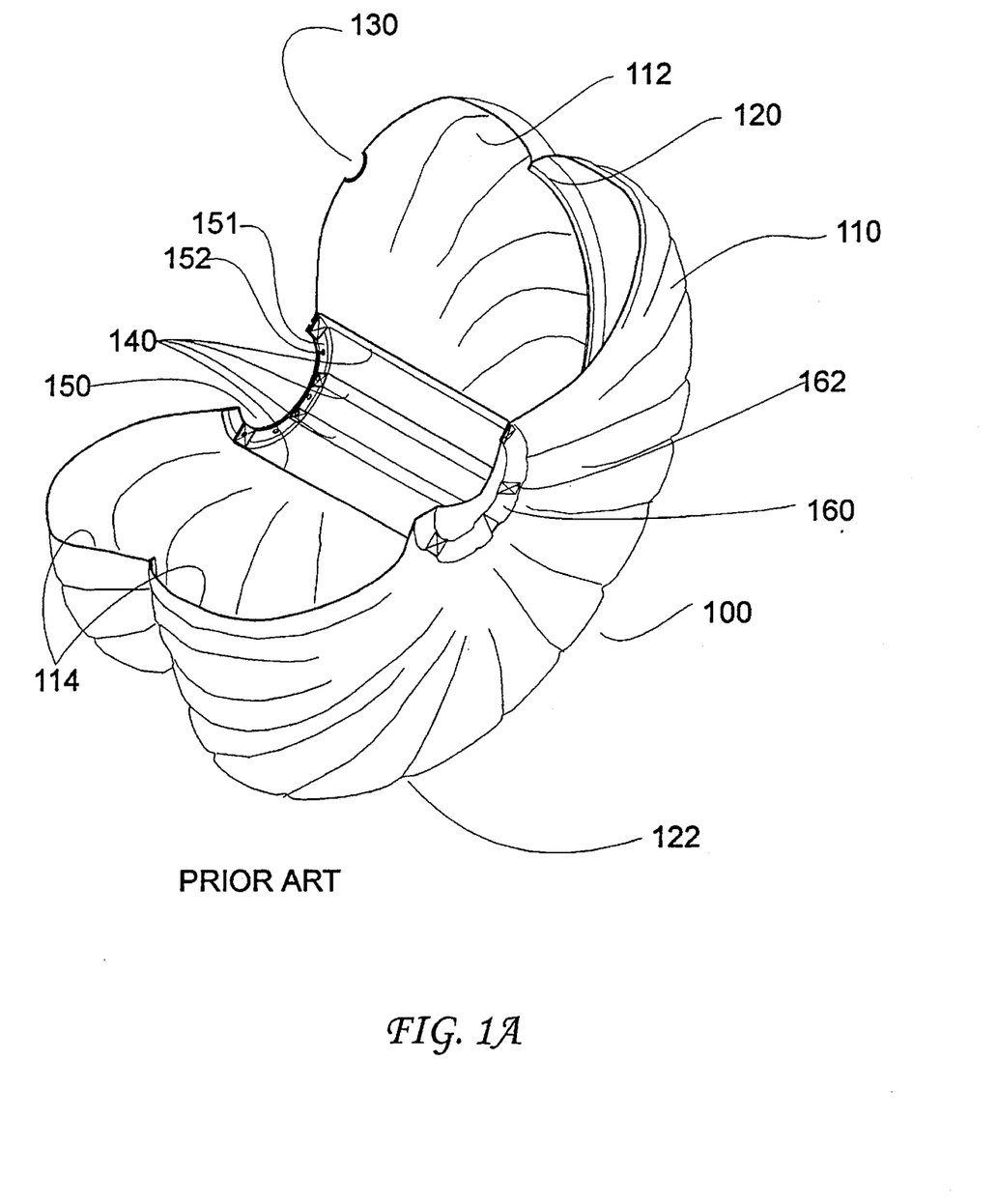
FIG. 1A is a partial cutaway perspective view of a conventional prior art driver side airbag showing the tethers which create the flat ellipsoidal shape of the airbag.

Referring to the accompanying drawings wherein like reference numerals refer to the same or similar elements, a partial cutaway perspective view of a conventional driver side airbag showing the tethers which create a flat ellipsoidal shape is illustrated in FIG. 1A. The airbag is constructed from two flat disks of material 110 and 112. The material is typically manufacturing from nylon fabric and coated on one side with a coating 114 of either neoprene or silicone, both of which are elastic rubbery films. The two pieces of fabric are initially laid on top of each other so that the circumferences match with the coated side facing out. A seam 120 is then created by sewing peripheral edges of the disks together. In some cases, a reinforcing piece of material is added between the edges in order to further strengthen the seam. Typically two, or sometimes more, rows of stitches are used to spread the stresses generated during inflation over a significant area of the seam 120.

A reinforcing flat ring or annulus 160 of material is typically sewn to what will become the front section of the airbag and the tethers 140 are sewn to the opposite side using stitches 162. With the airbag in this condition, the assembly is pulled through an inflator attachment hole 150 in what will become the rear side or panel of the airbag and then turned inside out so that the coated side of the airbag 114 is now on the inside as shown in FIG. 1A. Tethers 140 are now sewn to a reinforcing ring 151 surrounding hole 150 which serves to attach the airbag to the inflator, not shown. Holes 152 are placed in reinforcing ring 151 for this purpose. A vent hole 130 is also provided in one of the panels, i.e., the rear panel as shown, to complete the airbag. This hole 130 permits the gas to escape when the occupant loads the airbag during a crash, thereby absorbing the kinetic energy of the occupant. Port or hole will be used herein to mean an opening in the airbag through which gas can flow either in or out depending on the design and vent will mean a hole through which gas can flow out of the airbag.

When this airbag is inflated, folds and wrinkles 122 appear in the circumference of the airbag due to the unequal stress distribution in the fabric caused by the attempt to form a three dimensional object having curved surfaces from two dimensional flat sheets.

What has been described with reference to FIG. 1A is prior art and is presented here to illustrate the complexity of manufacturing a driver airbag and the effect of the tethers. At every location where threads and sewing is used, additional pieces of material are usually attached so as to minimize the stress concentrations in the material at those locations. The manufacture of airbags is labor intensive which is the reason that many are made in low labor cost countries. Furthermore, the fabric itself is quite expensive as is the process by which neoprene or silicone is used to coat the material.

It is obvious when observing an inflated airbag that it has not been optimized from a stress point of view. As a result, the material thickness required is that which will resist the maximum stresses in the airbag which typically occur at only one or a few locations. Nevertheless, since it is not convenient to vary the thickness of the material, the same thickness is used throughout. Observations of an inflated airbag also show that there are typically many wrinkles which occur, primarily at the circumference. These wrinkles could be eliminated through a different pattern of material; however this complicates the sewing process.

Figure 1B:
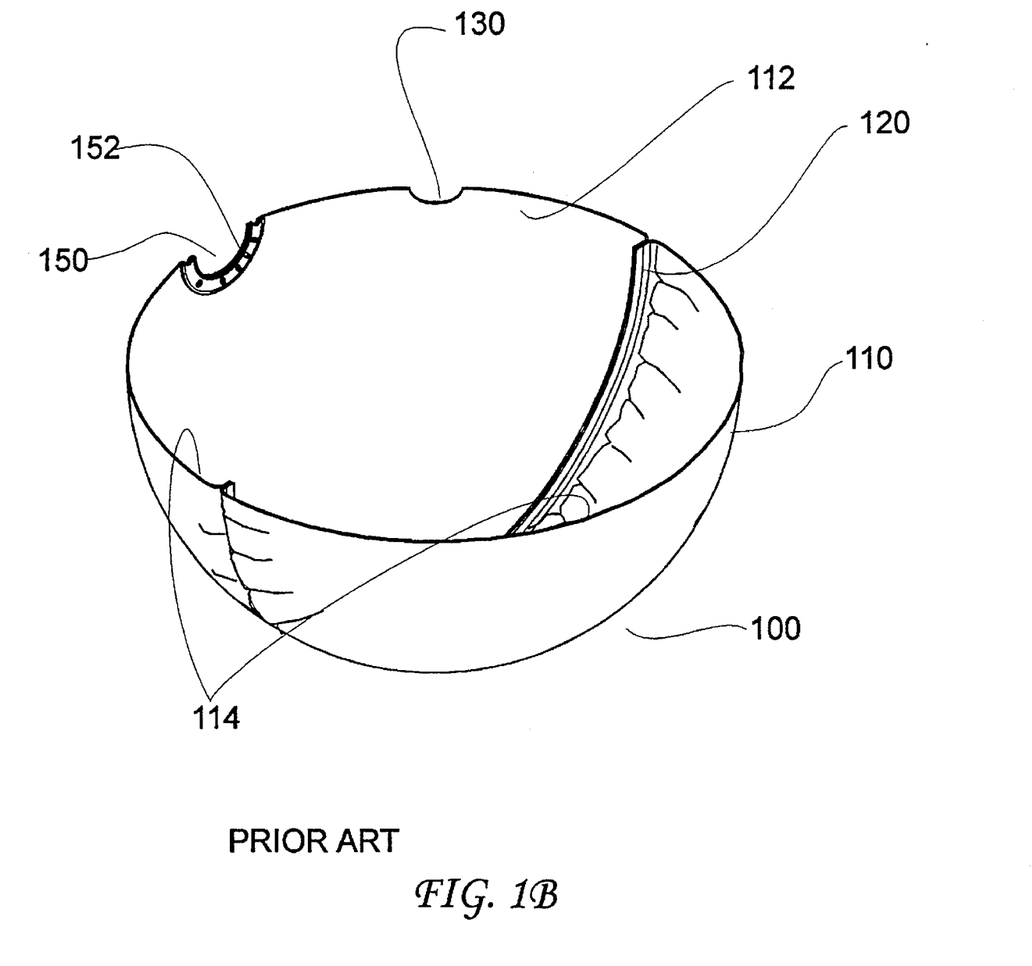
FIG. 1B is a partial cutaway perspective view of the prior art driver side airbag of FIG. 1A with the tethers removed.

FIG. 1B, where the same reference numbers are used to represent the same parts here and throughout this disclosure, illustrates what the driver airbag would approximately look like if the tethers were removed. This figure is a partial cutaway perspective view of the driver side airbag of FIG. 1A with the tethers removed. Experiments have shown that the airbag attains an approximate spherical shape. This, it can be shown, results from the fact that the threads can move relative to each other giving the bag some elasticity. If the tethers were not present, the occupant would usually interact with the airbag during deployment. Since this interaction results in injury to the occupant, the bag must be restrained from obtaining such a spherical shape (hence the required use of tethers).

Figure 2:
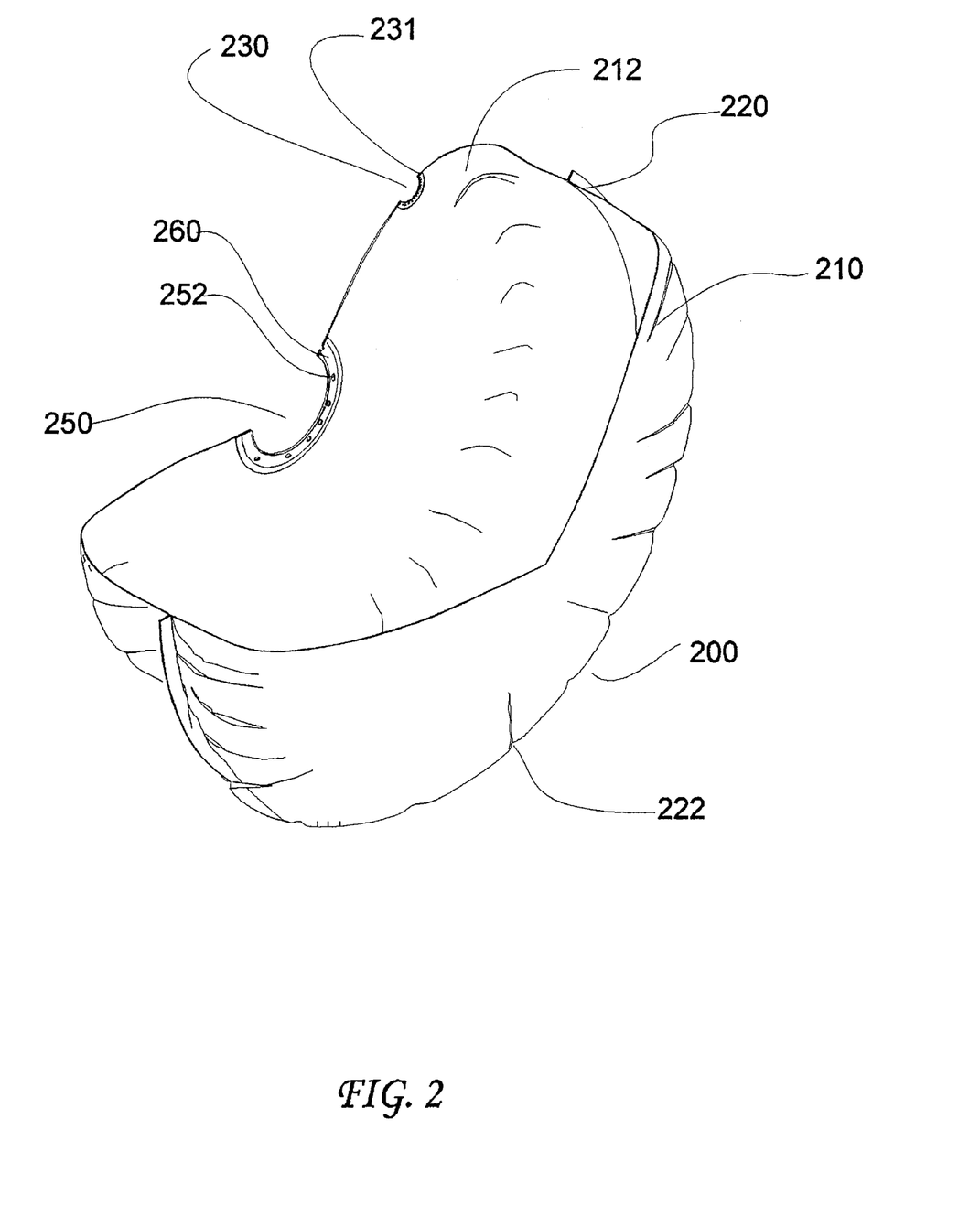
FIG. 2 is a partial cutaway perspective view of a driver side airbag made from plastic film.

In contrast to the fabric airbag illustrated in FIG. 1B, an equivalent airbag made from plastic film is illustrated in FIG. 2 which is a partial cutaway perspective view of a driver side airbag 200 made from film. This airbag is constructed from two flat disks of film material 210 and 212 which are sealed together by heat welding or adhesive to form seam 220. A hole 250 is provided as before for attachment to an inflator. This hole 250 is reinforced with a ring of plastic material 260 and holes 252 are provided in this ring 260 as before for attachment to the inflator. A vent hole 230 is also provided and it has a reinforcing plastic disk 231. Since this airbag is formed from flat plastic sheets 210 and 212, an unequal stress distribution occurs causing the customary wrinkles and folds 222.

Several different plastic materials are used to make plastic films for balloons as discussed in U.S. Pat. Nos. 5,188,558, 5,248,275, 5,279,873, and 5,295,892, which are included herein by reference. These films are sufficiently inelastic that when two flat disks of film are joined together at their circumferences and then inflated, they automatically attain a flat ellipsoidal shape. This is the same principle used herein to make a film airbag, although the particular film materials chosen are different since the material for an airbag has the additional requirement that it cannot fail during deployment when punctured.

When the distinction is made herein between an "inelastic" film airbag and an elastic conventional airbag, this difference in properties is manifested in the ability of the untethered conventional fabric airbag to respond to the pressure forces by becoming approximately spherical with nearly equal thickness and diameter while the film airbag retains an approximate ellipsoidal shape with a significant difference between the thickness and diameter of the airbag.

An analysis of the film airbag shown in FIG. 2, and detailed in the Appendix, shows that the ratio of the thickness to the diameter is approximately 6. This ratio can be increased by using films having greater elasticity. This ratio can also be either increased or decrease by a variety of geometric techniques some of which are discussed below. The surprising fact, however, is that without resorting to complicated tethering involving stitching, stress concentrations, added pieces of reinforcing material, and manufacturing complexity, the airbag made from film automatically provides nearly the desired shape for driver airbags upon deployment. Note that this airbag still has a less than optimum stress distribution which will be addressed below.

Figure 3A:
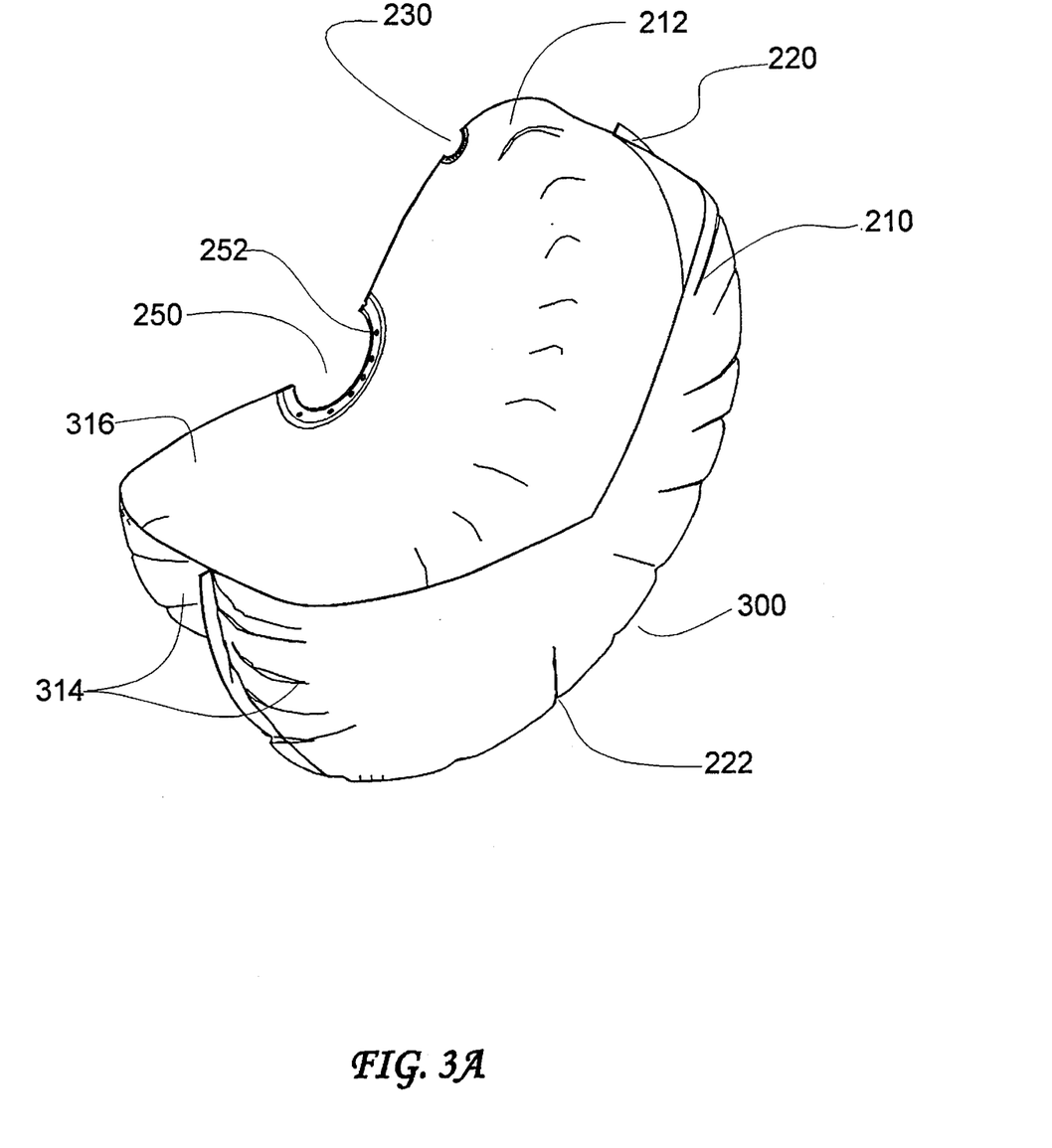
FIG. 3A is a partial cutaway perspective view of a driver side airbag made from plastic film and a fabric to produce a hybrid airbag.

Although there are many advantages in making the airbag entirely from film, there is reluctance on the part of the automobile manufacturers to make such a change in airbag design until the reliability of film airbags can be demonstrated. To bridge this gap, an interim design using a lamination of film and fabric is desirable. Such a design is illustrated in FIG. 3A which is a partial cutaway perspective view of a driver side airbag made from film 316 laminated with fabric 314 to produce a hybrid airbag 300. The remaining reference numbers represent similar parts as an FIG. 2. In all other aspects, the hybrid airbag acts as a film airbag. The inelastic nature of the film 316 causes this hybrid airbag 300 to form the proper shape for a driver airbag. The fabric 314, on the other hand, presents the appearance of a conventional airbag when viewed from the outside. The fabric 314 is attached to the film 316 directly by suitable adhesives, such that there are only two material layers, or possibly indirectly.

Figure 3B:
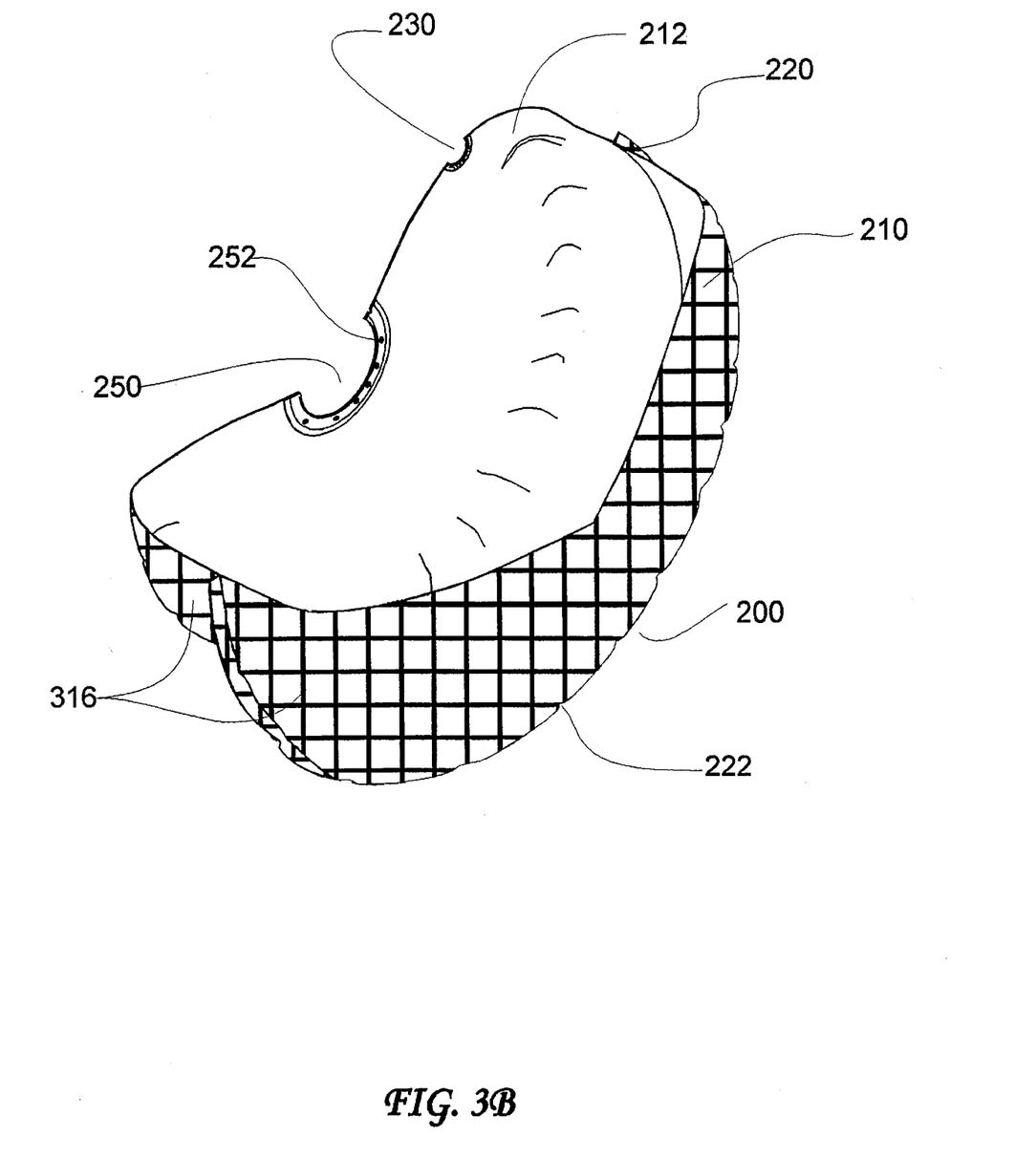
FIG. 3B is a partial cutaway perspective view of a driver side airbag made from plastic film and a net to produce a hybrid airbag.

Analysis, as disclosed in the above referenced patent application, has shown that a net is much stronger per unit weight than a fabric for resisting tears. This is illustrated in FIG. 3B which is a partial cutaway perspective view of a driver side airbag made from film and a net, which is preferably laminated to the film, to produce a hybrid airbag. The analysis of this system is presented in the above referenced patent application which is included herein by reference and therefore will not be reproduced here.

Figure 4A:
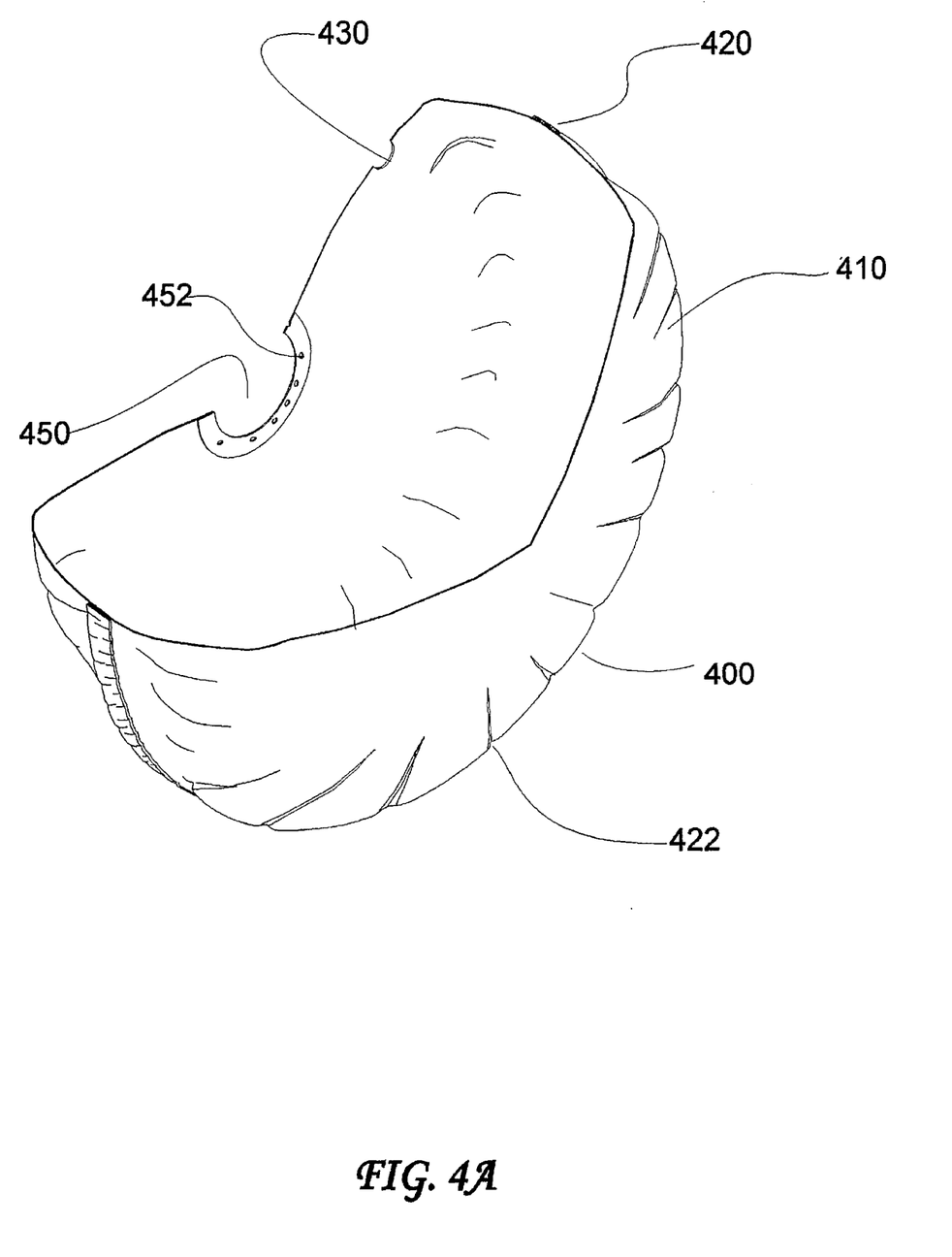
FIG. 4A is a partial cutaway perspective view of a driver side airbag made from plastic film using a blow molding process.

The airbag designs illustrated thus far were constructed from flat plastic sheets which have been sealed by heat welding, adhesive, or otherwise. An alternate method to fabricate an airbag is to use a molding process to form an airbag 400 as illustrated in FIG. 4A which is a partial cutaway perspective view of a driver side airbag made from film using blow molding (a known manufacturing process). Blow molding permits some thickness variation to be designed into the product. In particular, a thicker annular zone 420 is provided on the circumference of the airbag 400 to provide additional rigidity to the airbag in this area. Additionally, the material surrounding the inflator attachment hole 450 has been made thicker removing the necessity for a separate reinforcement ring of material. Holes 452 are again provided, usually through a secondary operation, for attachment of the airbag 400 to the inflator. For the manufacturing process, the analysis detailed in the Appendix may be used to provide for an airbag having the desired properties.

The vent hole 430 is formed by a secondary process and reinforced, or, alternately, provision is made in the inflator for the gases to exhaust, thereby removing the need for the hole 430 in the bag material itself. Since this design has not been stress optimized, the customary wrinkles and folds 422 also appear.

Figure 4B:
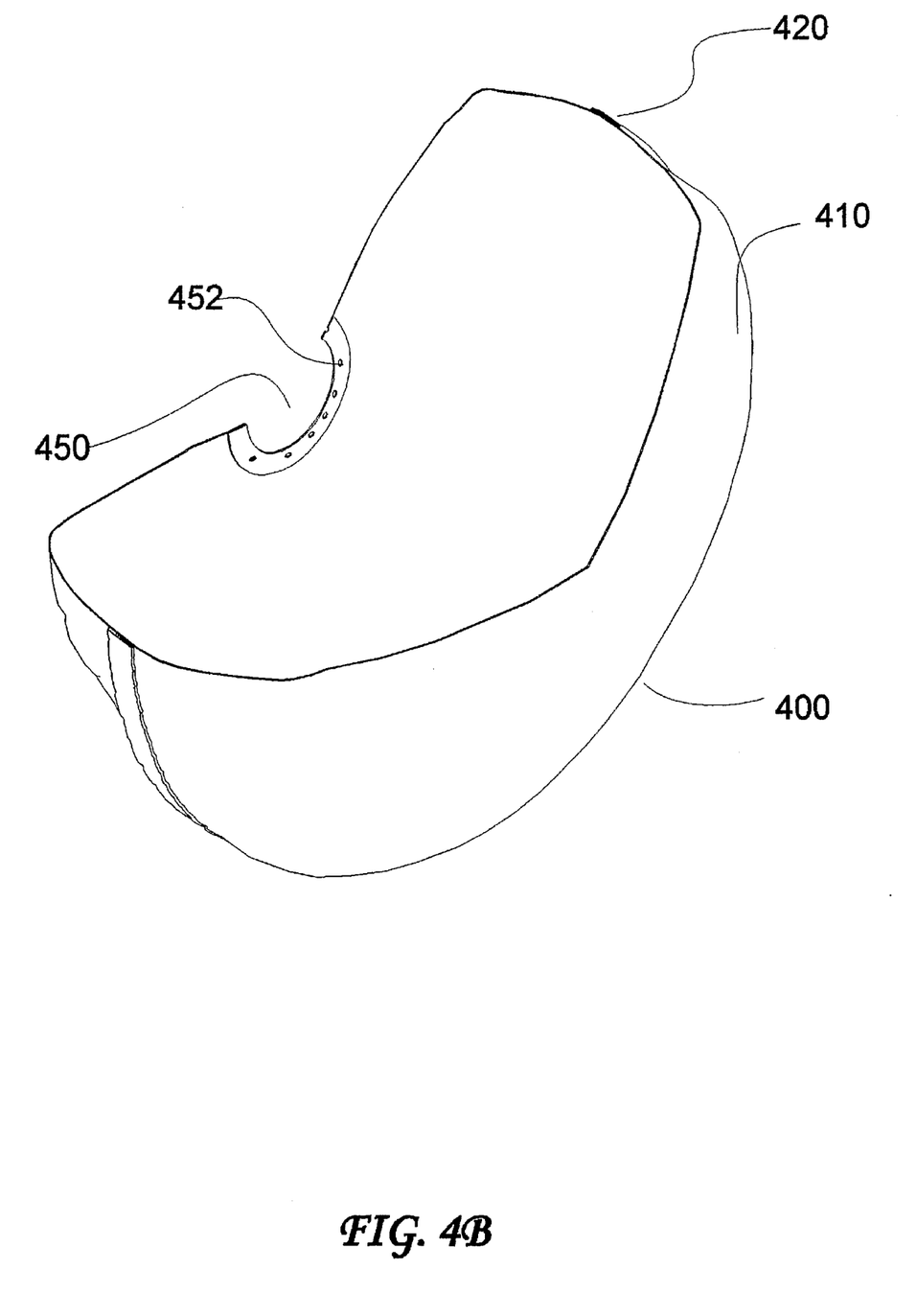
FIG. 4B is a partial cutaway perspective view of a driver side airbag made from plastic film using a blow molding process so that the airbag design has been partially optimized using finite element airbag model where the wrinkles have been eliminated and where the stresses within the film are more uniform.

One advantage of the blow molding process to manufacture airbags is that the airbag need not be made from flat sheets. Through careful analysis using a finite element program for example, the airbag can be designed to substantially eliminate the wrinkles and folds seen in the earlier implementations. Such a design is illustrated in FIG. 4B which is a partial cutaway perspective view of a driver side airbag made from film using a blow molding process where the airbag design has been partially optimized using a finite element airbag model. This design has a further advantage in that the stresses in the material are now more uniform permitting the airbag to be manufactured from thinner material.

Figure 4C:
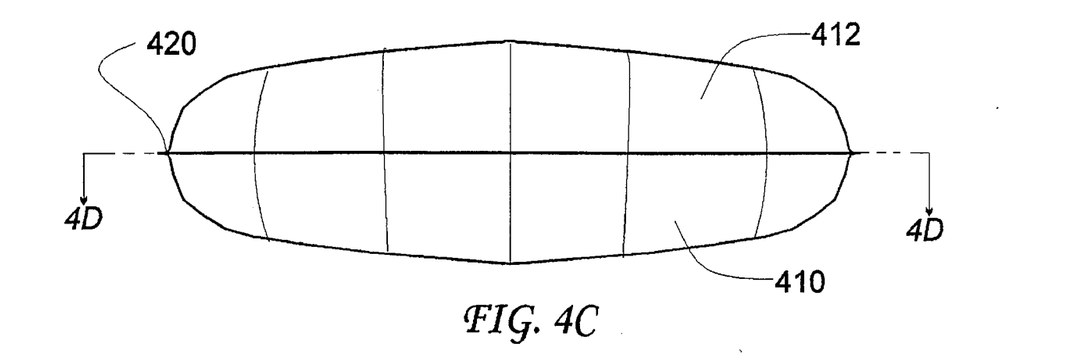
FIG. 4C is a cutaway view of a driver side airbag made from plastic film showing a method of decreasing the ratio of thickness to effective diameter.
Figure 4D:
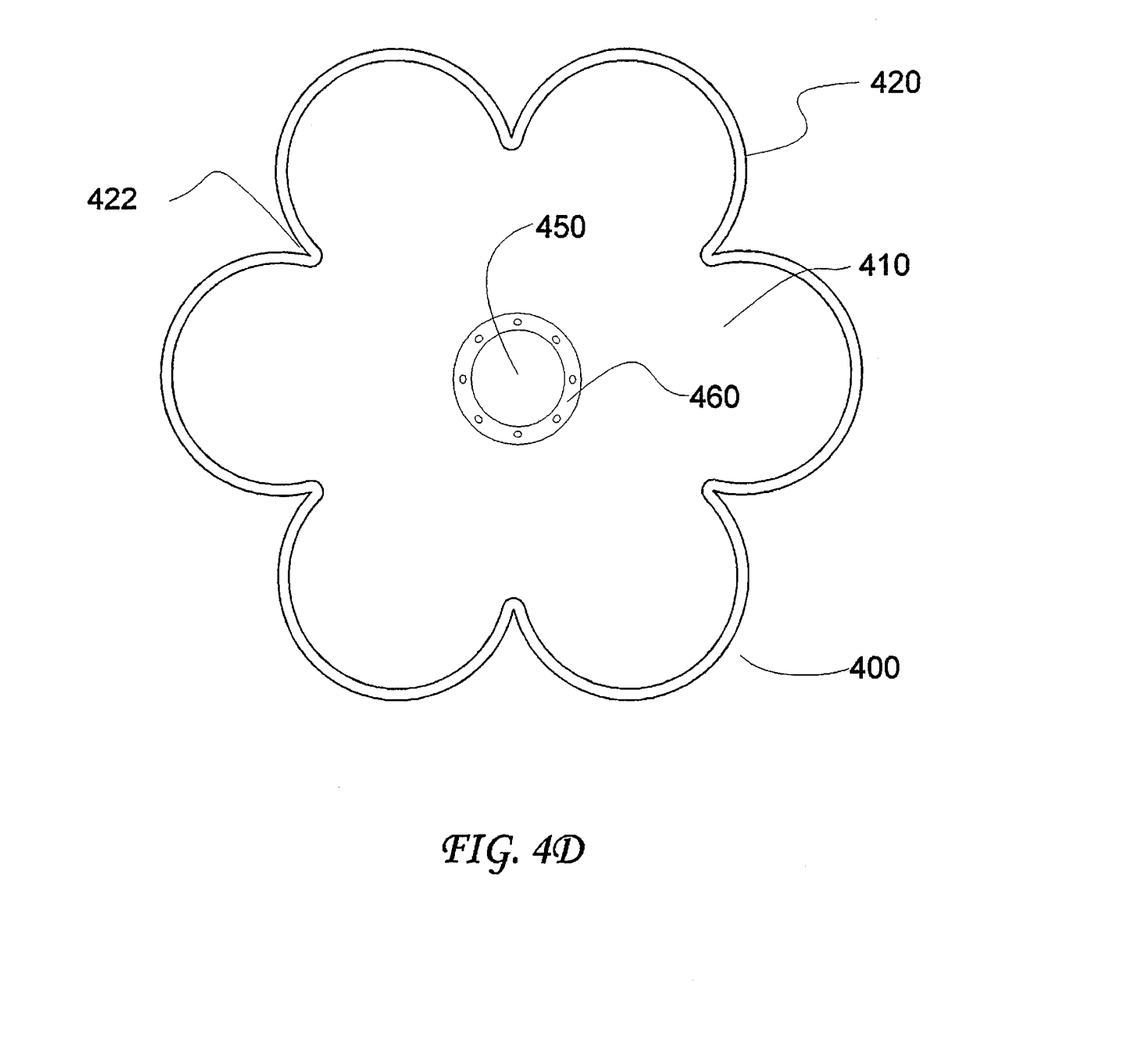
FIG. 4D is a view of a driver side airbag of FIG. 4C as viewed along line 4D—4D.

In some vehicles, the inflated airbag comes too close to the driver if the ratio of thickness to diameter is 6. In these applications it is necessary to decrease this ratio to 0.5 or less. Thickness herein means the dimension of the inflated airbag measured coaxial with the steering column and diameter, or average or effective diameter, is the average diameter measured in a plane perpendicular to the thickness. This ratio can be obtained without resorting to tethers in the design as illustrated in FIG. 4C which is a side view of a driver side airbag made from film where the ratio of thickness to effective diameter decreases. FIG. 4D is a view of the airbag of FIG. 4C taken along line 4D—4D. This airbag 400 is manufactured from two sheets of material 410 and 412 which are joined together by sealing to form seal 420. Inflator attachment hole 450 is reinforced with a ring of plastic material 460 as described above. Many circumferential geometries can be used to accomplish this reduction in thickness to diameter ratio, or even to increase this ratio if desired. The case illustrated in FIG. 4C and FIG. 4D is one preferred example.

Figure 5:
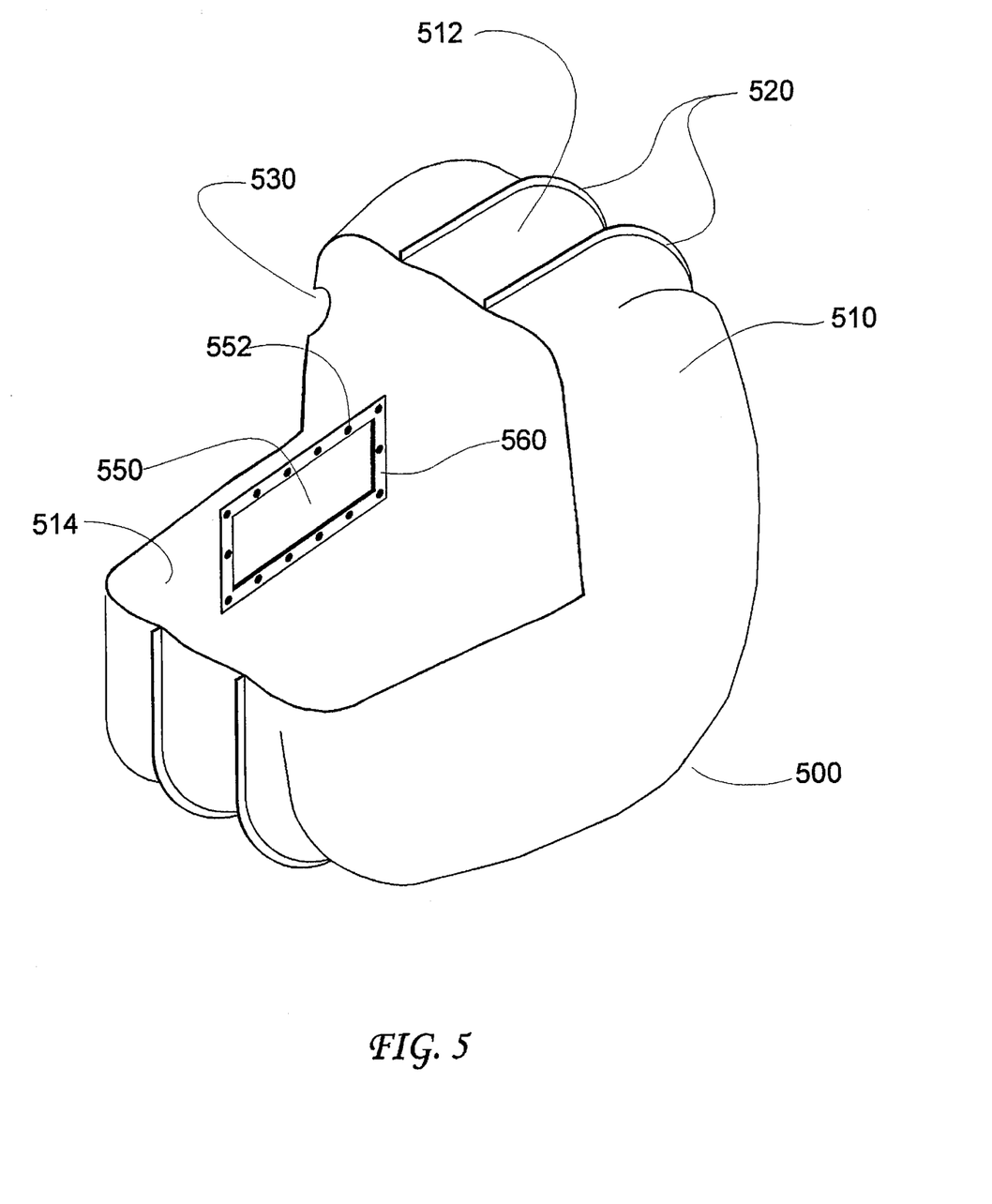
FIG. 5 is a partial cutaway perspective view of a passenger side airbag made from plastic film.

The discussion above has been limited to the driver airbag which is attached to the vehicle steering wheel. This technology is also applicable to passenger side airbag, which is generally attached to the instrument panel, as illustrated in FIG. 5 which is a partial cutaway perspective view of a passenger side airbag 500 made from three pieces of flat film 510, 512 and 514 which have joined seams 520 between adjacent pieces of film 510, 512, 514. Although illustrated as being constructed from a plurality of sheets of plastic film, this airbag can also be made by blow molding or other similar molding process, i.e., as one unitary sheet. The inflator attachment hole 550 is now typically rectangular in shape and is reinforced by a rectangular reinforcement plastic ring 560 having inflator mounting holes 552. A vent hole 530 is also provided to vent air and gases from the deploying airbag 500.

Figure 6:
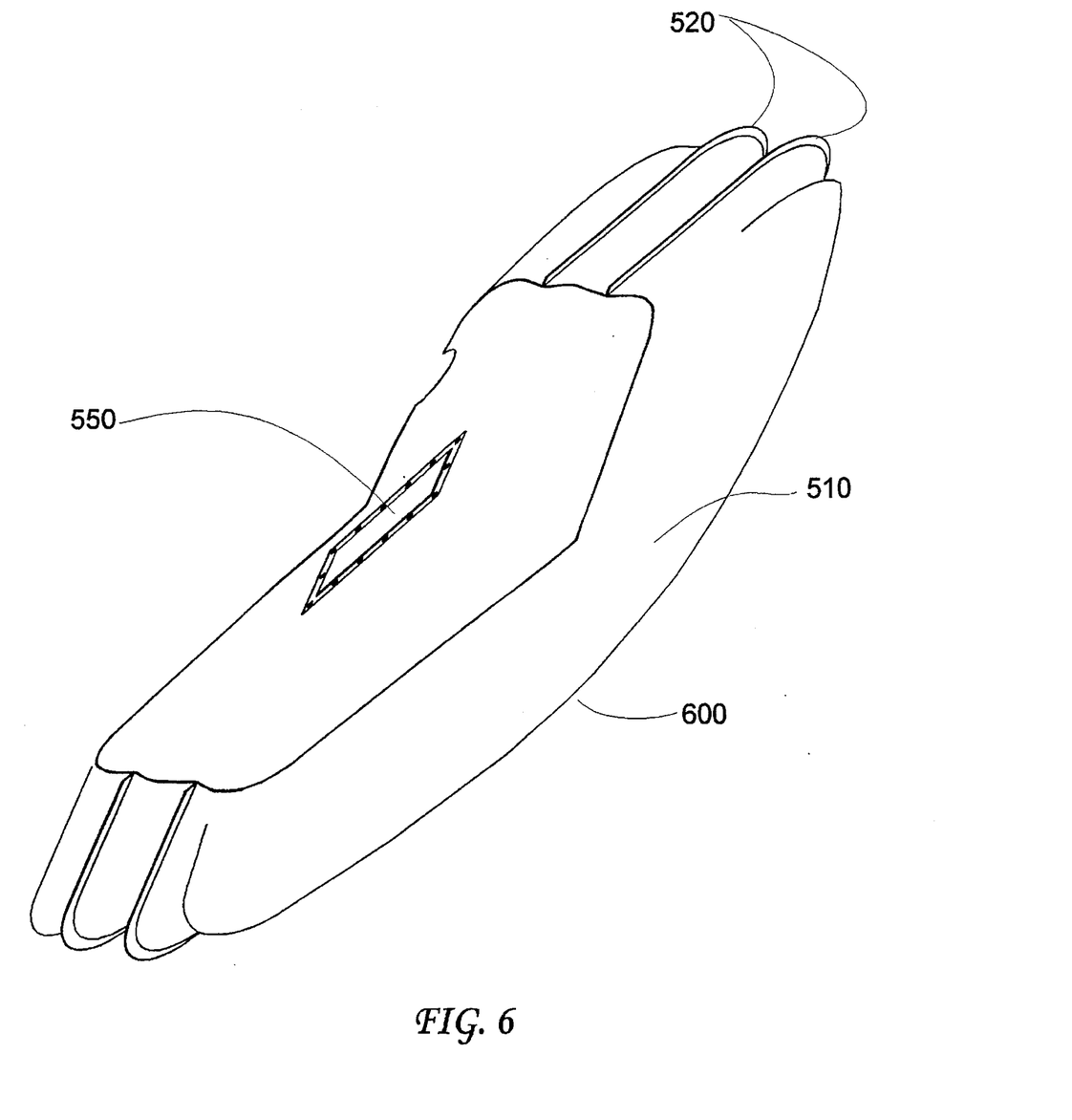
FIG. 6 is a partial cutaway perspective view of an airbag made from plastic film providing protection for all of the occupants of the front seat of the vehicle.

The shape of the airbag can be infinitely varied to suit the particular application. FIG. 6, for example, is a partial cutaway perspective view of an airbag made from film which provides protection for all of the occupants of the front seat of the vehicle. Naturally, some provision needs to be made in this case to eliminate the interference from the steering wheel. It is anticipated that future vehicles will have a lighter weight steering wheel and column assembly when steer-by-wire systems are implemented. Such steering assemblies can then be made to move out of the way of a deploying airbag in an accident.

Figures 7, 7A:
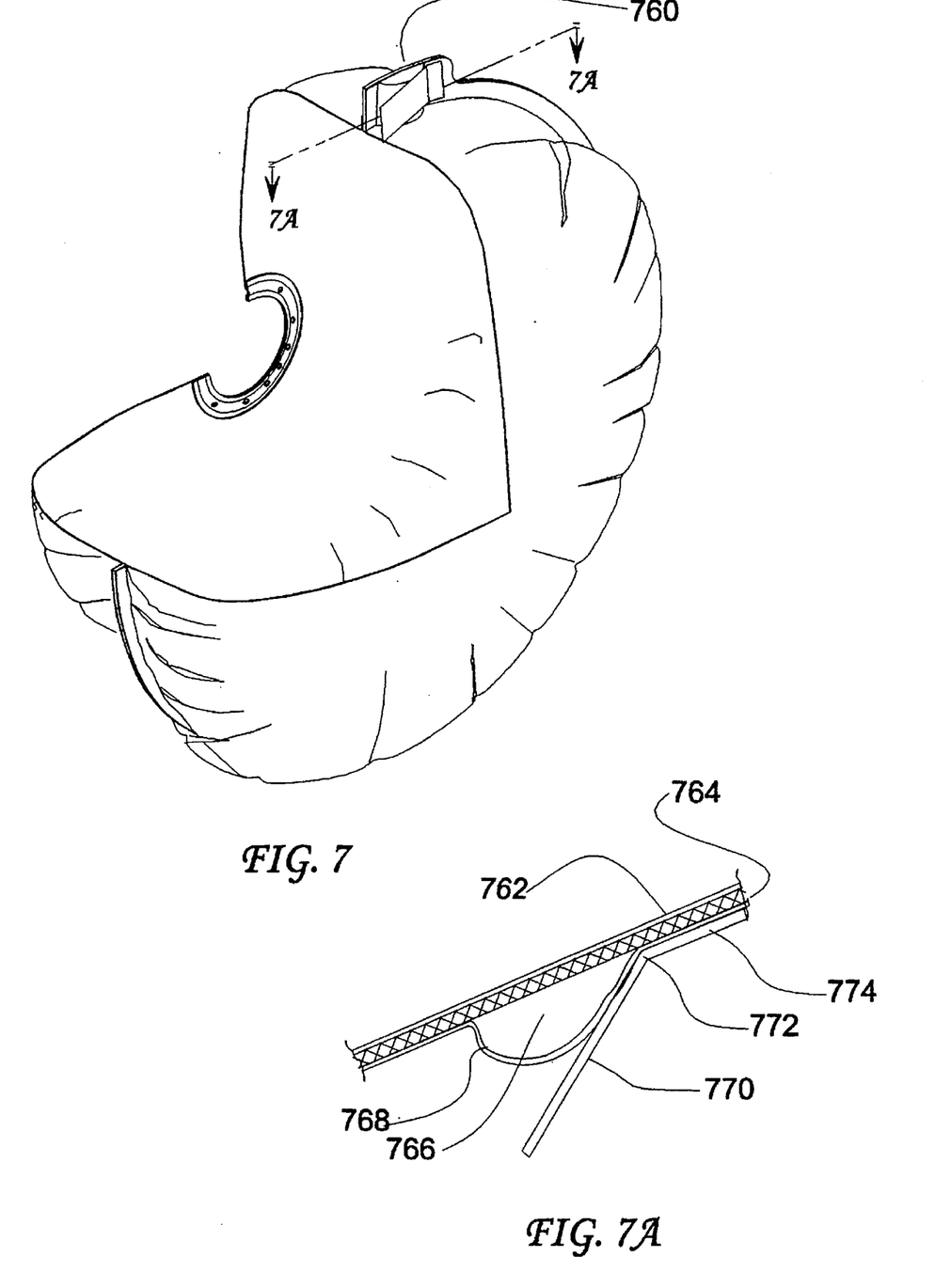
FIG. 7 is a partial cutaway perspective view of a driver side airbag made from plastic film having a variable vent in the seam of the airbag
FIG. 7A is a cross-sectional view of the driver side airbag having a variable vent in the seam of the airbag taken along the line 7A—7A of FIG. 7.

As an alternate to providing a fixed vent hole as illustrated in the previous examples, a variable vent hole can be provided as shown in FIGS. 7 and 7A, FIG. 7 being a partial cutaway perspective view of a driver side airbag made from film having a variable vent in the seam of the airbag. In this embodiment of an airbag, a hinged elastic member 770 is biased so that it tends to maintain vent 760 in a closed position. As pressure rises within the airbag, the vent 760 is forced open as shown in FIG. 7 and FIG. 7A, which is a detail of the vent 760 shown in FIG. 7 taken along line 7A—7A. This construction enables the use of a smaller inflator and also reduces the maximum chest acceleration of the occupant in a crash and more accurately controls the deceleration of the occupant. In FIGS. 7 and 7A, vent 760 contains a opening 766 formed between film layer 768 and reinforcement member 764. Film layer 762 is also sealed to reinforcing member 764. Member 770 is attached to reinforcing member 764 through film 768. A weakened section 772 is formed in member 770 to act as a hinge. The elasticity of the material, which may be either metal or plastic, is used to provide the biasing force tending to hold the variable opening closed.

In a conventional airbag module, when the inflator is initiated, gas pressure begins to rise in the airbag which begins to press on the deployment door. When sufficient force is present, the door breaks open along certain well-defined weakened seams permitting the airbag to emerge from its compartment. The pressure in the airbag when the door opens, about 10 to 20 psi, is appropriate for propelling the airbag outward toward the occupant, the velocity of which is limited by the mass of the airbag. In the case of a film airbag, this mass is substantially less, perhaps by as much as a factor of ten, causing it to deploy at a much higher velocity if subjected to these high pressures. This will place unnecessary stresses in the material and the rapid movement of the airbag past the deployment door could induce abrasion and tearing of the film by the deployment door. A film airbag, therefore, must be deployed at a substantially lower pressure. However, conventional deployment doom require this higher pressure to open.

Figure 8:
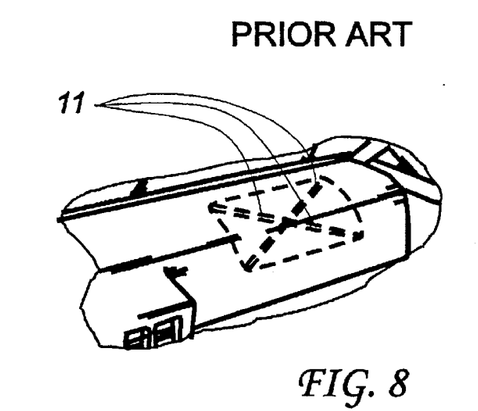
FIGS. 8 and 9 are reproduced FIGS. 7 and 8 from U.S. Pat. No. 5,390,950 to Barnes et al. showing a prior art method and arrangement for forming an airbag deployment opening in an automobile interior trim piece.
Figure 9:
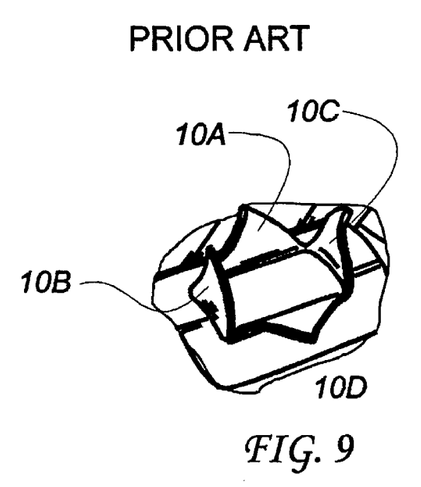

In U.S. Pat. No. 5,390,950 to Barnes et al., which is included herein by reference, a method of opening the deployment door by means of a pyrotechnic cutting out of the deployment door is disclosed. This, or a comparable system, is preferably utilized in conjunction with a film airbag. This system is illustrated in FIGS. 5–9 in U.S. Pat. No. 5,390,950 to Barnes et al., of which FIGS. 8 and 9 herein correspond to FIGS. 7 and 8 in Barnes et al., showing this method and arrangement for forming an airbag deployment opening in an automobile interior trim piece. A detailed description of operation of the components illustrated in these figures is contained in the Barnes et al. patent. Briefly though, the arrangement in Barnes et al. has pyrotechnic means 11 placed along seams 11 in the trim piece, i.e., the dashboard as shown in FIG. 8, so that upon activation of the pyrotechnic means 11, the trim piece is opened as shown in FIG. 9 separating into pieces 10A, 10B, 10C and 10D. Other low pressure deployment door release methods will now become obvious to those skilled in the art.

There has thus been shown and described an airbag system with self shaping airbag which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. An inflatable occupant restraint device in an occupant protection system of a vehicle, comprising:
   at least two pieces of substantially flat inelastic plastic film having peripheral edges, a first one of said at least two pieces of inelastic plastic film having at least one port;
   first attachment means for attaching said at least two pieces of inelastic plastic film together only at said peripheral edges to form a substantially sealed airbag;
   inflating means for inflating said airbag, said inflating means providing gas to said airbag through said at least one port;
   coupling means for coupling said airbag to said inflating means;
   initiation means for initiating said inflating means in response to a crash of said vehicle; and
   second attachment means for attaching said inflating means to said vehicle,
   such that upon inflation of said airbag by said inflating means, said at least two pieces of inelastic plastic film deform substantially without stretching.

2. The device in accordance with claim 1, wherein said at least one port comprises a single port and said airbag is both inflated and subsequently deflated through said single port.

3. The device in accordance with claim 1, wherein the ratio of the thickness of said airbag to an average diameter of said airbag is less than 0.6.

4. The device in accordance with claim 1, wherein said at least two pieces of inelastic plastic film are formed such that said airbag when inflated is substantially without wrinkles.

5. The device in accordance with claim 1, wherein said second attachment means attach said airbag to a steering wheel of the vehicle.

6. The device in accordance with claim 1, wherein said second attachment means attach said airbag to an instrument panel of the vehicle.

7. The device in accordance with claim 1, wherein said airbag when deployed extends substantially across a front seat of said vehicle.

8. The device in accordance with claim 1, wherein said at least two pieces of said airbag are sealed using heat welding.

9. The device in accordance with claim 1, wherein the ratio of the thickness of said airbag to its effective diameter is less than 0.7.

10. The device in accordance with claim 1, further comprising means for preventing the propagation of a tear connected to each of said at least two pieces of inelastic plastic film.

11. The device in accordance with claim 1, wherein said at least two pieces of inelastic plastic film are substantially flat such that upon inflation of said airbag by said inflating means, said at least two pieces of inelastic plastic film deform substantially without stretching to create a shape where the thickness is substantially smaller than the width or height.

12. The device in accordance with claim 1, wherein said at least two pieces of inelastic plastic film are substantially flat such that upon inflation of said airbag by said inflating means, said at least two pieces of inelastic plastic film deform substantially without stretching to provide said airbag with an ellipsoidal shape.

13. The device in accordance with claim 1, further comprising a layer of deformable material attached to each of said at least two pieces of inelastic plastic film.

14. The device in accordance with claim 13, wherein said deformable material is a fabric and is attached directly to each of said at least two pieces of inelastic plastic film.

15. The device in accordance with claim 13, wherein said deformable material is a net and is attached directly to each of said at least two pieces of inelastic plastic film.

16. The device in accordance with claim 1, wherein said second attachment means comprise a reinforcement ring arranged in said first piece of inelastic plastic film and surrounding said at least one port, said reinforcement ring having apertures therein.

17. The device in accordance with claim 16, wherein, said reinforcement ring in said first piece of said inelastic plastic film is not connected by tethers via said apertures in said reinforcement ring to a second one of said at least two pieces of inelastic plastic film.

18. The device in accordance with claim 1, wherein said first piece of inelastic plastic film comprises at least one variable outlet vent, said at least one variable outlet vent comprising pressure responsive means for controlling opening of said at least one variable outlet vent and thus flow of gas through said at least one variable outlet vent in response to pressure within said airbag, such that upon inflation of said airbag, said at least one variable outlet vent is substantially closed until said airbag is impacted by said occupant at which time said at least one variable outlet vent opens by an amount determined by the pressure in said airbag thereby controlling the deceleration of said occupant.

19. In a vehicle having an occupant and an occupant protection system, an inflatable occupant restraint comprising:

a sealed, pressurizable airbag made substantially of inelastic plastic film, said airbag having an inlet port and at least one variable outlet vent, said at least one variable outlet vent comprising pressure responsive means for controlling opening of said at least one variable outlet vent to thereby control flow of gas through said at least one variable outlet vent in response to the pressure within said airbag;

inflating means for inflating said airbag by directing gas to an interior of said airbag through said inlet port;

initiation means for initiating said inflating means in response to a crash of said vehicle; and attachment means for attaching said inflating means to said vehicle, such that upon inflation of said airbag by said inflating means, said at least one variable outlet vent is substantially closed until said airbag is impacted by said occupant at which time said at least one variable outlet vent opens by an amount determined by the pressure in said airbag thereby controlling the deceleration of said occupant.

20. In a vehicle having an inflatable occupant protection system for protecting an occupant in a passenger compartment in the vehicle during a crash, an inflatable occupant restraint comprising:

an airbag made substantially of inelastic plastic film;

sealing means for sealing said airbag except for at least one port;

inflating means for inflating said airbag by directing gas into an interior of said airbag through said at least one port;

first attachment means for attaching said airbag to said inflating means;

initiation means for initiating said inflating means to cause deployment of said airbag in response to a crash of said vehicle;

second attachment means for attaching said inflating means to said vehicle; and cover means coupled to said initiation means for covering and retaining said airbag in a compartment adjacent to said inflating means, said cover means having a surface facing the passenger compartment which opens upon deployment of said airbag, said cover means comprising pyrotechnic means for opening said cover means;

such that upon initiation of said inflating means by said initiation means, said pyrotechnic means is also initiated to open said cover means prior to emergence of said airbag from said compartment retaining said airbag.

21. In a vehicle having an inflatable occupant protection system, an inflatable occupant restraint device comprising:

an airbag at substantially comprising a single piece of inelastic plastic film having at least one port formed therein;

inflating means for inflating said airbag by directing gas into an interior of said airbag through said at least one port;

first attachment means for attaching said airbag to said inflating means;

initiation means for initiating said inflating means in response to a crash of said vehicle; and second attachment means for attaching said inflating means to said vehicle, such that upon inflation of said airbag by said inflating means, said single piece of inelastic plastic film deforms substantially without stretching.

22. The device in accordance with claim 21, wherein said airbag is manufactured by a method of blow molding.

23. The device in accordance with claim 21, wherein the thickness of said airbag varies from one part of said airbag to another.

24. The device in accordance with claim 21, wherein the thickness of circumferential edges of said airbag is greater than the thickness of the main portion of said airbag.

25. The device in accordance with claim 21, wherein upon inflation of said airbag by said inflating means said single piece of inelastic plastic film deforms substantially without stretching to create a shape where the thickness is substantially smaller than the width or height.

* * * * *